United States Patent Office 3,361,249
Patented Jan. 2, 1968

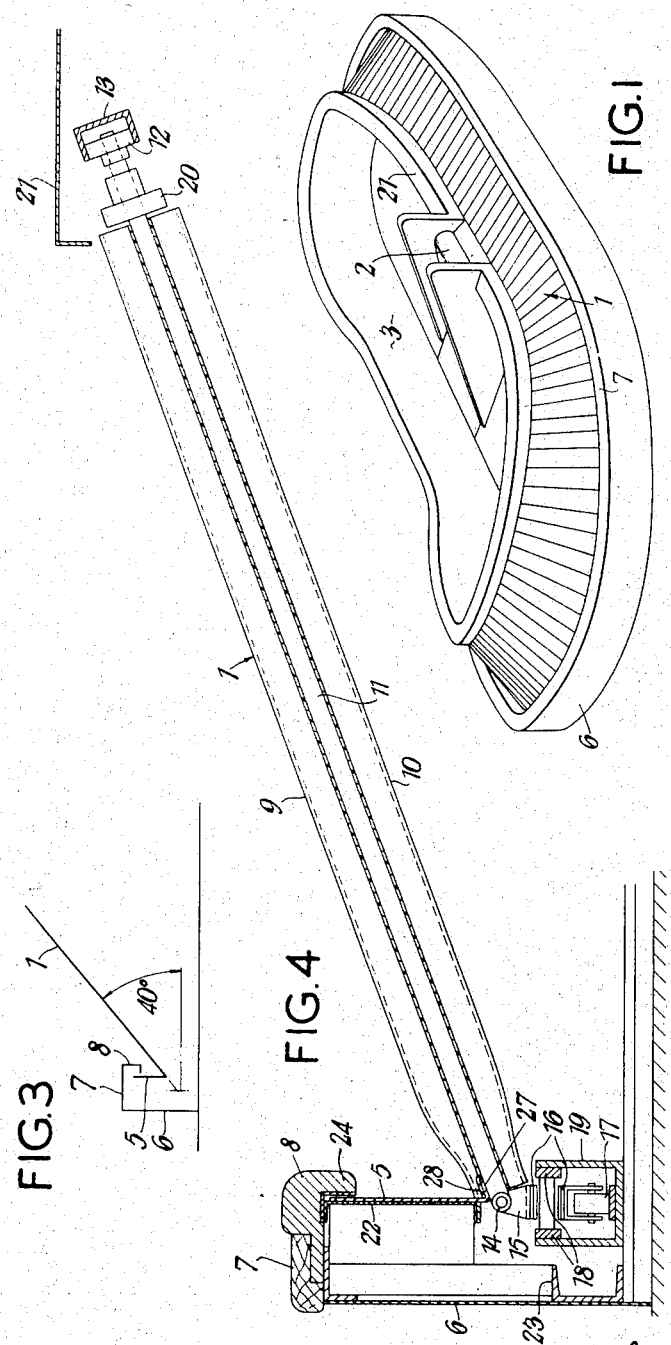

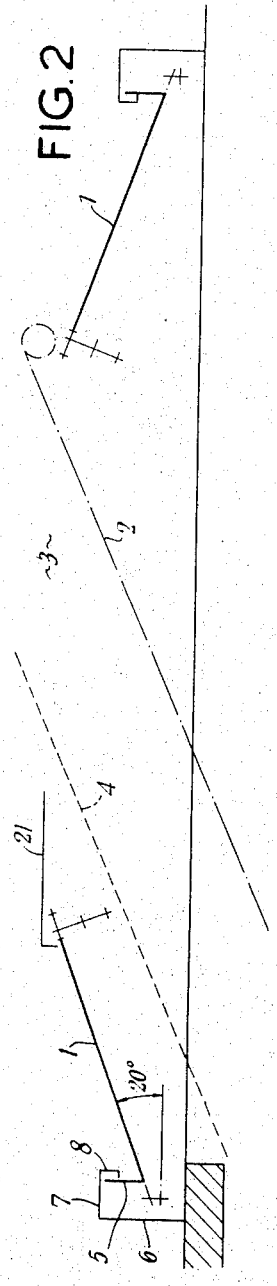
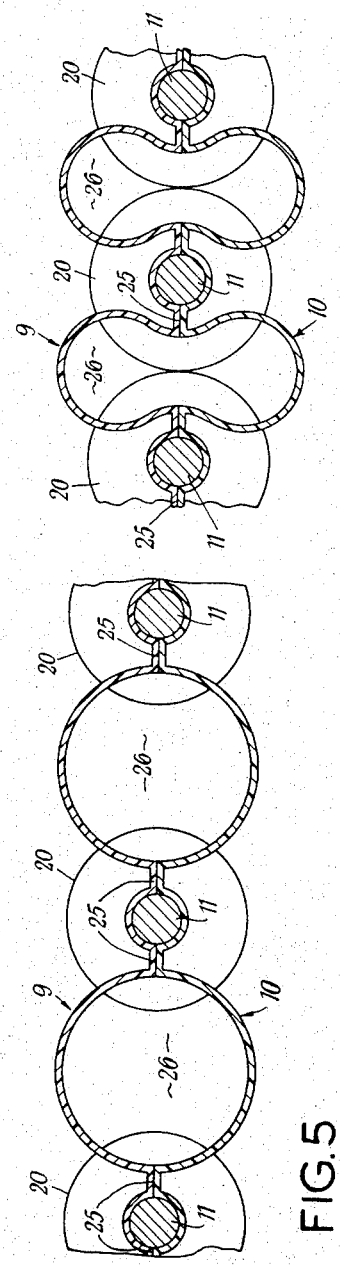
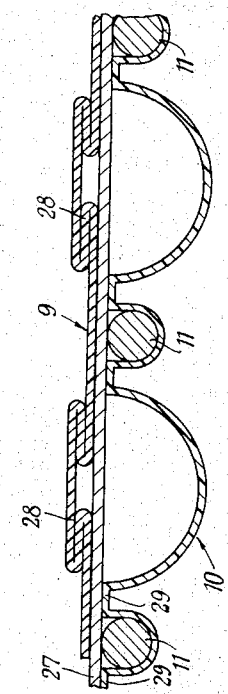

3,361,249
APPARATUS FOR DISTRIBUTING LUGGAGE, PARCELS AND THE LIKE
Hubert William Cadman, Cornwall, and William Thomas White, Erith, Kent, England, assignors to Sovex Limited, Erith, Kent, England, a corporation of Great Britain
Filed Oct. 13, 1966, Ser. No. 586,428
Claims priority, application Great Britain, Oct. 18, 1965, 43,981/65
7 Claims. (Cl. 198—103)

ABSTRACT OF THE DISCLOSURE

Apparatus for distributing articles, luggage, parcels and the like comprising an endless flexible conveyor presenting an article-reception and carrying surface which is of annular shape in plan view with a slope transversely of its direction of movement and which faces upwardly so that it can carry articles throughout its length, driving means for moving the conveyor in an annular path, and supporting and guiding means for the conveyor arranged so that the slope differs as between at least one part of the path and another part thereof.

This invention concerns improvements relating to apparatus for distributing and/or for facilitating the sorting of luggage, parcels or the like, for example for presenting luggage for collection by passengers at ports, airports, railway stations, customs halls and the like.

It has already been proposed, for such purposes, that luggage should be delivered by a conveyor onto a moving reception surface inclined downwardly towards a front edge to which passengers have access for the purpose of selecting their own items of luggage. This arrangement presents some difficulty where a wide variety of kinds of luggage has to be catered for, as is nowadays the case. Some articles, such as cases made of a plastics material, tend to remain at the top of the slope, whereas others, such as metal-bound boxes, readily slide down to the front edge. If the slope is increased to a degree at which all kinds of luggage will slide down freely, some will descend at excessive speed and, if heavy, are liable to cause damage or injury. An object of the present invention is to obviate this difficulty.

According to the invention, apparatus of the kind set forth comprises a moving article-reception surface having a slope, transversely of the direction of movement, which differs as between one place and another. With this arrangement, the articles can be delivered by a feeding conveyor at a place of moderate slope down which normal articles will readily slide to and become distributed along a front edge accessible to the public, for instance, whereas other articles will be carried to a place of such greater slope that all articles will slide down.

The reception surface preferably takes the form of an endless, continuously moving, conveyor which is of annular shape in plan view. The annular shape need not be circular, but may be oblong, for example. Articles may be fed on to the reception surface at its upper, inner, edge by a conveyor, or conveyors, rising through the central opening, access to the public, for instance, being provided for at the lower outer, edge. Thus, with an oblong reception conveyor, parts of moderate slope may be provided along the long sides and parts of greater slope at semi-circular ends. The reception surface may then be fed at a point or points having the moderate slope, e.g. at the middle or towards one end of one of the aforesaid long sides.

One embodiment of the invention by way of example will now be more fully described with reference to the accompanying drawings, in which:

FIG. 1 is a general perspective view of an apparatus in accordance with the invention, FIG. 2 a diagrammatic transverse section of the apparatus, FIG. 3 a comparable, longitudinal, section through one end thereof, FIG. 4 is a section, similar to one half of FIG. 2, but illustrating one practical form of reception surface for such apparatus, FIG. 5 is a cross section through the surface shown in FIG. 4 taken in a straight part of its path, FIG. 6 a similar section taken at a place of maximum curvature of path, and FIG. 7 a similar section taken near the lower edge of the reception surface.

With reference, firstly, to FIGS. 1 to 3, the reception surface illustrated is an endless, continuously moving, conveyor 1 of oblong annular form as seen in plan view. The surface comprises parts of moderate slope transversely of the direction of movement, for example a slope of 20° to the horizontal, along the long sides (as shown in FIG. 2) and parts of greater slope, for example 40°, at the semi-circular ends (as shown in FIG. 3). Articles are fed on to the reception surface at its upper, inner, edge by an endless-belt conveyor 2 which rises through the central opening 3 from below. The clearance available for this purpose is indicated by a broken line 4 in FIG. 2. The reception surface is fed at the middle of one long side, where the slope is moderate. Access to the public is permitted at the lower, outer, edge, particularly along the two long sides. If desired, the ends of the reception surface may be rendered inaccessible by barriers, not shown. A flexible skirt 5, which moves with the reception surface 1, rises from its outer edge. The said outer edge is surrounded by a wall 6 surmounted by a fixed rail at 7 which may be provided with a cushioning or rubbing pad at 8. Cushioning means may be especially desirable at the places of greater slope.

When the apparatus is in use, normal articles fed to the reception surface 1 by the conveyor 2 will readily slide down to the outer, lower, edge of the surface where they become distributed in positions accessible for easy removal. Other articles may be carried along to the end of the oblong surface, where the steeper slope will assist in causing them to slide down. In an article is impeded from so doing at the first end reached, there will be a further opportunity for it to slide down at the other end.

The reception surface illustrated in greater detail in FIGS. 4 to 7 comprises two layers 9, 10 of fabric, for example nylon fabric, connected to a series of inclined rods 11 extending transversely of the annular surface. At their upper ends, the rods are supported by rollers 12 (FIG. 4) running in a channel shaped guide 13 which extends around the inner edge of the surface 1, rising at the ends of the oblong formation and following a lower path along the long sides. At the lower end, each rod is pivotally connected at 14 to a bracket 15 extending upwardly from a section of an endless flexible driving chain 16 which runs under the outer edge of the surface 1. The chain is supported on rollers 17 and is guided by lateral shoes 18 in a channel-shaped rail 19. Each rod 11 also carries a pitch-limiting or spacing collar 20 near its upper end. The parts beyond the upper edge of the surface 1 are masked by a cover 21. The skirt 5 is guided against a wall 22 suspended from framework 23 supporting the wall 6 and its upper edge is masked by a dependent portion 24 of the pad 8.

As shown in FIGS. 5 and 6, the two layers 9, 10 of fabric are stuck symmetrically around opposite halves of the rods 11. Immediately on each side of the rods, the said layers are also stuck together, as indicated at 25. The two layers 9, 10 are otherwise free of each other and the spaces 26 between them are filled with compressible bodies of sponge rubber or with long inflated air bags. At places of maximum separation of the rods 11, where the slope of the surface 1 is least, these spaces will be distended to roughly cylindrical form, as shown in somewhat idealised manner in FIG. 5. At places of minimum separation of the rods 11, where the slope is greatest, the spaces 26 will be collapsed to roughly figure-of-eight form, as shown in FIG. 6. It will be seen that the collars 20 are widely separated in FIG. 5, but are in contact and limit approach to each other of the rods 11 in FIG. 6.

At the lower edge of the surface 1, as illustrated in FIGS. 4 and 7, an inturned flange 27 on the skirt 5 is introduced between the layer 9 on the one hand and the layer 10 and rods 11 on the other. On the upper side, the layer 9 is unfilled and folded down onto the flange 27 and stuck thereto in the form shown at 28. On the lower side, the layer 10 only embraces the rods 11 and is stuck to the flange 27 on each side thereof, at 29.

As the surface 1 continuously circulates, the layers 9 and 10 alternate between the forms shown in FIGS. 5 and 6, but at all times provide a series of slat-like crests for resiliently receiving and supporting the articles delivered to the apparatus.

The receiving surface may alternatively consist of a series of spaced or overlapping slats, for example of metal, which flare towards the lower edge of the surface. Such slats may be furnished with a covering of fabric or plastics material which bridges gaps alternately opening and closing between the slats. This covering may be resilient or may be arranged to pucker above or below the gaps at places where change of slope causes the slats to approach one another.

In another form, the reception surface may consist essentially of an endless conveyor band or the like which is guided in an annular path having a slope which differs between one place and another.

There need not be two circumferential regions each of greater and smaller sope, as in the above-described example. There may be only one region or more than two regions of greater slope.

Instead of the oblong form, the reception surface may be circular, as seen in plan view, or may be of more complex form such as a dumb-bell form. In the case of a reception surface of circular form, there may be a steady variation in slope between a maximum and minimum, so that the surface is that of a frustrum of a cone of circular, but not right-circular, shape.

The transition between regions of greater and smaller slope may be gradual or relatively abrupt.

In place of a feeding conveyor which rises through the central opening, provision may be made for a conveyor which descends from above to a point adjacent to the upper edge of the reception surface.

Auxiliary driving means, e.g., a chain driven synchronously with the chain 16, may be applied to the upper edge of the reception surface, if required.

We claim:

1. Apparatus for distributing articles of the nature of luggage, parcels and the like, comprising an endless flexible conveyor presenting an article-reception and carrying surface which is of annular shape in plan view, which has a slope transversely of its direction of movement so that it can carry articles throughout the said length, driving means for moving the said conveyor in an annular path, and supporting and guiding means for the said conveyor arranged so that the said slope differs in degree with respect to a horizontal plane as between at least one part of the said path and another part thereof.

2. Apparatus as claimed in claim 1 and further comprising conveying means arranged to supply articles to the annular reception surface near its upper edge at a place where the slope is less than elsewhere.

3. Apparatus as claimed in claim 1 and further comprising article-feeding means which is arranged to rise through the central opening in the annular reception surface to a delivery point adjacent the upper, inner, edge of the said surface.

4. Apparatus as claimed in claim 1, wherein the annular reception surface comprises a plurality of adjacent slat-like sloping elements extending radially of the said surface and guiding means at the upper and lower ends of individual said elements which permit the said elements to close up and move apart to accommodate the changes in slope.

5. Apparatus as claimed in claim 1, wherein the annular reception surface comprises a series of spaced, sloping, slat-like elements extending radially of the said surface and guided at their upper and ower ends, and flexible material bridging the gaps between the said elements.

6. Apparatus as claimed in claim 1, wherein the annular surface comprises a plurality of radially extending slat-like, sloping elements, guiding means at the upper and lower ends of individual said elements which permit the said elements to close up and move apart to accommodate the changes in slope, and a driving chain provided at the lower ends at least of the said elements and operatively connected thereto.

7. Apparatus as claimed in claim 1, wherein the annular reception surface comprises a series of spaced, radially extending, sloping slat-like elements, guiding means for the said elements at their upper and lower ends and elongated bag-shaped bodies of flexible material filled with a deformable medium and arranged between the said elements to bridge the gaps between them.

References Cited

UNITED STATES PATENTS 3,180,483    4/1965    Johnston _____ 198—209

FOREIGN PATENTS 725,456    1/1966    Canada.

RICHARD E. AEGERTER, *Primary Examiner.*